United States Patent [19]

Anderson et al.

[11] Patent Number: 4,730,892

[45] Date of Patent: Mar. 15, 1988

[54] OPTICAL FIBER MECHANICAL SPLICE

[75] Inventors: John C. Anderson, Ottawa; Frederick D. King, Richmond; John C. Goodwin, Nepean, all of Canada

[73] Assignee: Northern Telecom Limited, Montreal, Canada

[21] Appl. No.: 840,102

[22] Filed: Mar. 17, 1986

[51] Int. Cl.⁴ .................................................. G02B 6/36
[52] U.S. Cl. ................................. 350/96.21; 350/96.20
[58] Field of Search ............... 350/96.20, 96.21, 96.22

[56] References Cited

U.S. PATENT DOCUMENTS

| | | | |
|---|---|---|---|
| 4,029,390 | 6/1977 | Chinnock et al. | 350/96.21 |
| 4,057,448 | 12/1977 | Miller | 350/96.21 X |
| 4,155,624 | 5/1979 | Logan et al. | 350/96.21 |
| 4,179,186 | 12/1979 | Tynes | 350/96.21 |
| 4,214,811 | 7/1980 | Benoit et al. | 350/96.21 |
| 4,276,113 | 6/1981 | Carlsen et al. | 350/96.21 X |
| 4,458,984 | 7/1984 | Roberts et al. | 350/96.21 |
| 4,506,946 | 3/1985 | Hodge | 350/96.21 |

Primary Examiner—William L. Sikes
Assistant Examiner—Akm E. Ullah

[57] ABSTRACT

A device for making a splice between optical fibers, has a hollow cylindrical elastomer member within a housing. The elastomer member seats in a V-groove and a screw is driven against the elastomer member to deform the member and so grip and render coaxial a pair of fibers having ends meeting within the elastomer member. Jacketed portions of the two fibers are clamped on each side of the junction zone.

13 Claims, 8 Drawing Figures

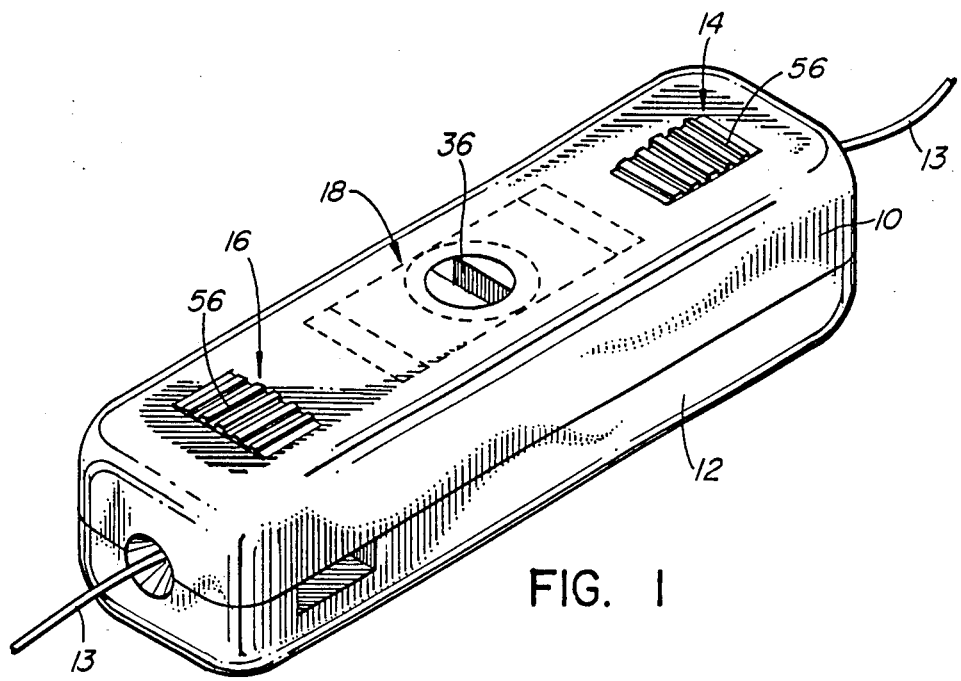
FIG. 1
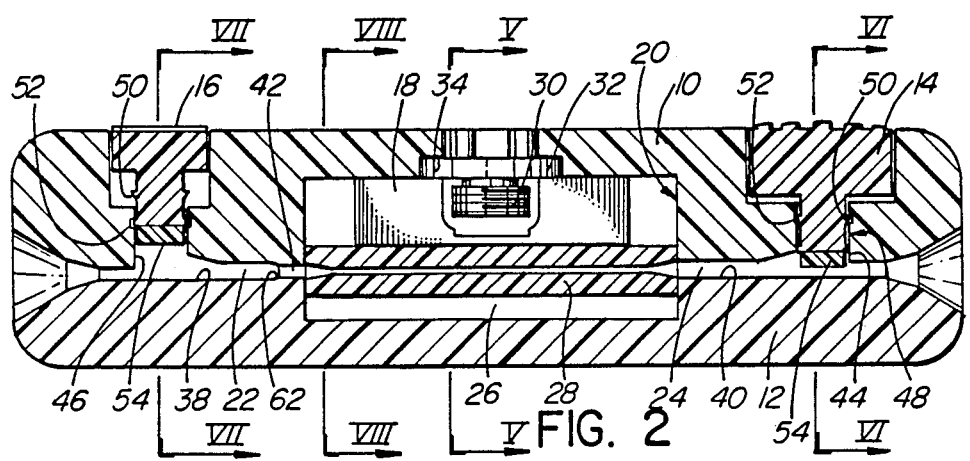
FIG. 2
FIG. 3

OPTICAL FIBER MECHANICAL SPLICE

BACKGROUND OF THE INVENTION

This invention relates to an optical fiber splice for coupling fibers together.

When placing optical fibers in end-to-end relationship to minimize light loss, it is desirable to have a rugged splice that can be simply and reliably used in field installations. The fibers at the junction should be firmly held to prevent the fibers from moving apart at the junction.

U.S. Pat. No. 4,257,674 (Griffin et al) describes a splice for holding the ends of optical fibers in end-to-end relationship. The splice mechanism includes a pair of sections having mating planar surfaces. One of the surfaces has an axially aligned groove facing the other surface to form a triangular section passage. The sections are formed of an elastomeric material of sufficient resilience to receive an optical fiber of marginally greater diameter than that defined by the passage. A sleeve is mounted about the elastomeric sections to hold them in assembled relationship.

To use the splice device the ends of fibers to be joined are cleaved and stripped of jacket material. One of the fibers is inserted into the triangular passage defined by the groove and facing surface until it extends approximately to midway through the passage. The other fiber is then inserted from the other end until it abuts the end of the first fiber. Because the triangular passage is undersized in comparison to the stripped fiber, a force fit results which acts both to render the fibers substantially coaxial and to grip the fibers so as to prevent axial separation. A problem with such mechanical splices is that the force acting laterally on the fibers must be great enough to centralize the two fibers. On the other hand, if that force is to be high it means that a fiber is subjected to great frictional resistance as it is inserted into the triangular passage. Consequently, it is difficult for a user on inserting the second fiber to feel when the fiber abuts the first-inserted fiber.

U.S. Pat. No. 3,734,594 (Trambaruio) describes a similar splice. A hollow elastomer cylinder having a bore marginally greater in diameter than fibers to be joined has annular bearing surfaces at respective ends. Fibers are inserted into the bore from both ends and then the bearing surfaces are pushed towards one another. As the elastomer material is squeezed from the ends, it expands in the middle and in doing so grips the fibers and acts to coaxially align them. Ideally, on compressing the elastomer from its ends the inner surface of the elastomer moves a small and uniform distance radially inwardly. In fact, owing to non-uniformity in elasticity of a typical elastomer block the radial movement is not uniform and this can lead to microbending of the fibers gripped by the splice with consequent splice loss.

SUMMARY OF THE INVENTION

According to one aspect of the invention, there is provided a device for holding a pair of fibers in axial alignment, comprising: a resiliently compressible cylindrical tubular member having an opening of circular cross-section extending axially therethrough for slidably receiving and axially aligning ends of a pair of fibers; a base member having an axially extending V-groove for receiving the tubular member; and means for urging the tubular member in a transverse direction to compress the tubular member onto the fiber ends.

The means for urging may comprise a bias member movably mounted to the cover member for movement in a transverse direction into the V-groove into and out of a position in which the bias member compresses the tubular member when the cover member and base member are mated with the tubular member received in the V-groove. For example, the bias member may be screw-mounted to the cover member and screw-drivable towards the groove to compress the tubular member. A stop may be formed within the base member to limit movement of the bias member towards the groove and thereby limit deformation of the tubular member.

In a preferred embodiment, the cover and base members when mated define therebetween a housing for containing the bias member and tubular member, and a pair of passages leading from opposite ends of the mated cover and base members to the housing for containing jacketed portions of the fibers adjacent the fiber ends. At least one of the cover and base members may carry clamps locatable axially of the housing and actuable to clamp the jacketed portions of the fibers in respective passages.

The passages leading from the ends of the mated cover and base members to the housing can also be defined by V-grooves in one or other of the cover and base members. Preferably the passages are flared outwardly to enable easy introduction of fiber from both ends of the cover and base members. One of the passages can have a relatively narrow inner section whereby a jacketed fiber having an end portion stripped of jacket for a predetermined length can be inserted into the passage and is prevented from further insertion once the jacket fills the wider part of the passage. By ensuring that a stripped part of the fiber is an accurate length, it can be presumed that the extreme end of the fiber is accurately centered under the bias member. The opening through the tubular member can also flare outwardly at the ends of the tubular member to prevent microbending.

The clamps can comprise studs mounted within respective opening in one of the cover and base members, such opening extending transverse to the passage. The studs and opening can be formed with corresponding projections and recesses whereby when each stud is pressed into a fiber clamping position, it is retained there by engagement of the projection within the recess. A bottom end of each stud can have adhering thereto an resiliently compressible block whereby to longitudinally distribute pressure applied to the jacketed fiber by the clamps and thereby give strain relief.

The device can further include projections and associated resesses on the cover and a base to enable the cover and base members to be locked together in the mated position.

Preferably the housing members are made of a dimensionally and chemically stable molded glass filled epoxy material and the tubular member and the clamp block are formed of an elastomer having store hardness of 65A-80D.

BRIEF DESCRIPTION OF THE DRAWINGS

An embodiment of the invention will now be described by way of example with reference to the accompanying drawings in which:

FIG. 1 is a perspective view of an optical fiber splice according to the invention;

FIG. 2 is a central longitudinal sectional view of the device;

FIG. 3 is a plan view of the device;

DETAILED DESCRIPTION

Figure 4:
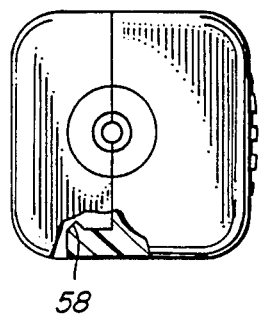
FIG. 4 is an end view of the device.
Figure 5:
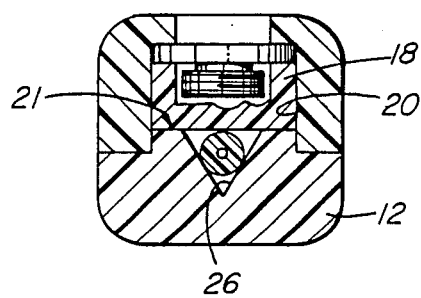
FIG. 5 is a sectional view along the line V—V of FIG. 2.

Referring in detail to the drawings, FIG. 1 shows an optical fiber splice device having cover and base housing members 10 and 12, first and second fibers 13 entering the device, a pair of clamps 14, 16 for clamping jacketed fiber within the device and a central screw-mounted bias member 18 for clamping stripped fiber ends at a junction zone.

Referring to the sectional views, the housing members define a generally rectangular housing 20 with passages 22, 24 extending away from the housing towards the opposed ends of the device. A lower surface of the housing 20 defined by an upper surface 21 of the member 12 has a longitudinal extending V-groove 26. An elongate elastomer body 28 of annular cross-section seats within the groove 26 and, in an under formed state, projects marginally above the surface 21. The bias member 18 is mounted over the elastomer member 28 and has a screw-threaded recess. Mounted within the recess is an adjustment screw 30 which has a flange 32 abutting at its top side against a seat 34 within the cover housing member 10. The bias member 18 has a slot 36 extending into its top end to enable manual rotation of the screw. As the screw is rotated, the bias member 18 is raised or lowered. The pressure that can be applied to deform body 28 is limited by abutment of bias member 18 with surface 21. This guarantees uniform deformation of the elastomer body 28 and thus repeatability as between different splices.

The passages are also defined on a lower side by V-grooves 38, 40 which extend from the housing 20 and flare outwardly at the device ends. The left-hand passage has a wide section 22 and a relatively short narrow section 42. This enables the insertion of a jacketed fiber having a stripped end portion to a predetermined position to bring the extreme end of the fiber under the bias member 18. The other passage 24 is dimensioned to receive a jacketed fiber throughout its length.

At opposed sides of the housing, the stud clamps 14, 16 are received within bores 44, 46 extending perpendicular to the longitudinal axis of the device. The clamps themselves are of T-section and have a spigot portion formed with a tapered angular projection 50. The walls defining the bores are formed with corresponding tapered angular recesses 52. Consequently, when the stud clamps are depressed, a position is reached at which the projections 50 seat within corresponding recesses 52. At this position an elastomer block 54 adhering to the lower end of each stud provides desired gripping of a jacketed portion of each fiber.

As shown in the plan view of FIG. 3, the top surface of the studs are serrated, the serrations 56 of the two studs 14, 16 extending in perpendicular directions. This ensures visual asymmetry of the device to indicate to a field engineer into which end the first fiber should be inserted.

Figure 6:
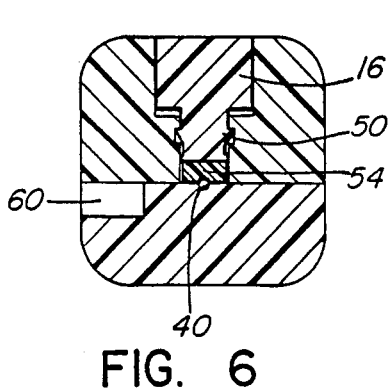
FIG. 6 is a sectional view along the line VI—VI of FIG. 2.
Figure 7:
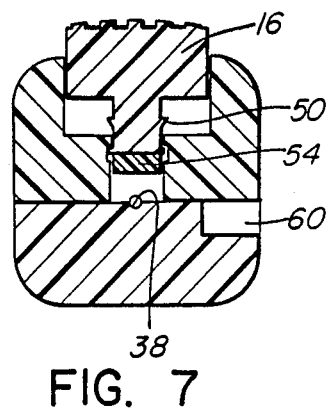
FIG. 7 is a sectional view along the line VII—VII of FIG. 2.
Figure 8:
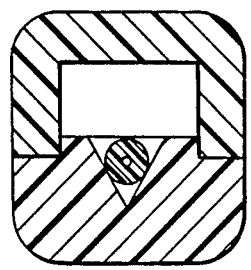
FIG. 8 is a sectional view along the line VIII—VIII of FIG. 2.

Also shown in a cutaway part of FIG. 4 is one of a pair of locally deformed regions 58 of the housing member moldings which enable the members to be snap fitted together. Cut-outs 60 (FIGS. 6 and 7) on opposed sides of the lower housing member adjacent respective studs 14, 16 enable insertion of a wedge to force the two housing members 10, 12 apart should that be necessary in use. The splice is thus reusable.

In operation, a fiber is stripped of its conventional plastics jacket over an end portion. The fiber is then inserted from the left-hand end of the device (FIG. 2) insertion being aided by the various flared arrangements through the composite bore. When the jacket abuts surface 62, the end of the stripped fiber portion should be directly below the bias member 18. The stud 16 is then pressed down to its natural seating position whereupon the associated elastomer block 54 bears against the jacketed fiber portion within the passage. The other optical fiber is then stripped of an end portion of jacket material and it too is inserted into the device from the opposed end. The central hole in the elastomer body 28 is sufficiently large that the other fiber can be slid freely into the hole until the user feels the fiber end surfaces abut. The hole is not so large however, that the fiber ends can slide past one another. Once it abuts the first fiber, the stud 14 is depressed to its seating position to grip the second fiber. In order to ensure alignment of the fibers, the bias member 18 is then screwed down to its stop position.

The temperature coefficient of expansion of the plastics used in the housing members and the clamps matches so that under wide temperature swings, the splice moves uniformly allowing <1 dB total splice loss over a temperature range from 40° C. to 70° C.

What is claimed is:

1. A device for holding a pair of fibers in axial alignment, comprising:

a resiliently compressible cylindrical tubular member having an opening of circular cross-section extending axially therethrough for slidably receiving and axially aligning ends of a pair of fibers;

a base member having an axially extending V-groove for receiving the tubular member; and means for urging the tubular member in a transverse direction into the V-groove to compress the tubular member onto the fiber ends.

2. A device as claimed in claim 1 further comprising corresponding projections and recesses on the cover member and the base member, the projections and recesses interengageable to lock the cover member and the base member together.

3. A device for holding a pair of fibers in axial alignment, comprising:

a resiliently compressible cylindrical tubular member having an opening of circular cross-section extending axially therethrough for slidably receiving and axially aligning ends of a pair of fibers;

a base member having an axially extending V-groove for receiving the tubular member;

means for urging the tubular member in a transverse direction into the V-groove to compress the tubular member onto the fiber ends; and a cover member matable with the base member to surround the tubular member, wherein the means for urging comprises a bias member movably mounted to the cover member for movement into and out of a position in which the bias member compresses the tubular member when the cover member and base member are mated with the tubular member received in the V-groove.

4. A device as defined in claim 3, wherein the bias member is screw-mounted to the cover member and is screw-drivable towards the V-groove to compress the tubular member.

5. A device as claimed in claim 3 wherein the base member presents an abutment face to limit movement of the bias member towards the V-groove and thereby limit deformation of the tubular member.

6. A device as defined in claim 3, wherein the cover member and base member when mated define therebetween a housing for containing the bias member and the tubular member and a pair of passages leading from opposite ends of the mated cover and base members to the housing for containing jacketed portions of the fibers adjacent the fiber ends.

7. A device as claimed in claim 6 wherein the passages leading from the ends of the mated cover member and base member to the housing are defined by V-grooves in one of the cover member and base member facing respective surfaces on the other of the cover member and base member whereby to define triangular section passages.

8. A device as claimed in claim 7 wherein the passages are flared outwardly at the opposite ends of the mated cover and base members to enable easy introduction of fiber into the passages.

9. A device as claimed in claim 8 wherein one of the passages has a relatively narrow inner section to accommodate a jacketed fiber having an end portion stripped of jacket and a wider outer section to accommodate a jacketed part on the fiber, and a junction between the inner and outer sections limiting the extent to which the fiber can be inserted into the passage.

10. A device as defined in claim 6, wherein at least one of the cover member and the base member carries clamps locatable axially of the housing and actuable to clamp the jacketed portions of the fibers in respective passages.

11. A device as claimed in claim 10 wherein the clamps comprise studs mounted within respective openings in one of the cover member and the base member, such openings extending transverse to the passages.

12. A device as claimed in claim 1 wherein the studs and associated openings are formed with corresponding projections and recesses whereby when each stud is pressed into a fiber clamping position, said stud is retained in the clamping position by interengagement of a projection with a recess.

13. A device as claimed in claim 1 wherein a bottom end of each of the studs has adhering thereto resiliently compressible block for distributing pressure applied to the jacketed fiber by the clamp.

* * * * *

UNITED STATES PATENT AND TRADEMARK OFFICE
CERTIFICATE OF CORRECTION

PATENT NO. :    4,730,892

DATED      :    15 March 1988

INVENTOR(S) :   John C. ANDERSON, Frederick D. KING,
                John C. GOODWIN It is certified that error appears in the above-identified patent and that said Letters Patent is hereby corrected as shown below:

At Column 6, Line 19, "1" is corrected to read --11--.

At Column 6, Line 25, "1" is corrected to read --11--.

Signed and Sealed this

First Day of November, 1988

Attest:

DONALD J. QUIGG

Attesting Officer

Commissioner of Patents and Trademarks